(12) United States Patent
Yasuda et al.

(10) Patent No.: US 11,325,467 B2
(45) Date of Patent: May 10, 2022

(54) GEAR TRANSMISSION

(71) Applicant: Kubota Corporation, Osaka (JP)

(72) Inventors: Toshifumi Yasuda, Sakai (JP); Yusuke Morita, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/321,786

(22) Filed: May 17, 2021

(65) Prior Publication Data

US 2022/0105800 A1    Apr. 7, 2022

(30) Foreign Application Priority Data

Oct. 5, 2020   (JP) .............................. JP2020-168721

(51) Int. Cl.
| | |
|---|---|
| *B60K 17/354* | (2006.01) |
| *F16H 37/08* | (2006.01) |
| *F16H 37/02* | (2006.01) |

(52) U.S. Cl.
CPC ....... *B60K 17/354* (2013.01); *F16H 37/0813* (2013.01); *F16H 37/021* (2013.01); *F16H 2702/00* (2013.01); *F16H 2702/04* (2013.01)

(58) Field of Classification Search
CPC . B60K 17/354; F16H 37/0813; F16H 37/021; F16H 2702/04; F16H 2702/00
See application file for complete search history.

(56) References Cited

U.S. PATENT DOCUMENTS

| | | | | |
|---|---|---|---|---|
| 9,003,908 B2 | * | 4/2015 | Sagawa | ................... F16H 63/44 74/335 |
| 2009/0066052 A1 | | 3/2009 | Bessho et al. | |
| 2017/0370422 A1 | * | 12/2017 | Bessho | ................... F16H 63/30 |

FOREIGN PATENT DOCUMENTS

| | | | | | |
|---|---|---|---|---|---|
| CN | 104265874 A | * | 1/2015 | | |
| CN | 105090435 A | * | 11/2015 | ........ | F16F 15/13415 |
| DE | 102016122463 A1 | * | 6/2017 | .......... | F16F 15/1206 |
| JP | 200967082 A | | 4/2009 | | |

* cited by examiner

*Primary Examiner* — Justin Holmes
(74) *Attorney, Agent, or Firm* — The Webb Law Firm

(57) ABSTRACT

A gear transmission having a speed changing section includes a speed changing gear for setting a speed stage and a shift gear slidably mounted on a rotation support shaft and operated to engage and disengage with the speed changing gear, the speed changing section configured to speed-change inputted power and to output the resultant power via the rotation support shaft. An arrangement is provided for facilitating engagement of the shift gear with the speed changing gear even when respective end faces of the shift gear and the speed changing gear hit each other. A transmission mechanism (20B) is provided for outputting power of a rotation support shaft (24) to a traveling device. The transmission mechanism (20B) has a transmission flexibility portion (80) which allows free rotation of the rotation support shaft (24) by a set rotation angle.

1 Claim, 9 Drawing Sheets

GEAR TRANSMISSION

CROSS-REFERENCE TO RELATED APPLICATION

This application claims priority to Japanese Patent Application No. 2020-168721 filed Oct. 5, 2020, the disclosure of which is hereby incorporated by reference in its entirety.

BACKGROUND OF THE INVENTION

1. Field of the Invention

The present invention relates to a gear transmission.

2. Description of Related Art

The gear transmission includes a speed changing section having a speed changing gear for setting a speed stage and a shift gear slidably mounted on a rotation support shaft and operated to be engaged/disengaged to/from the speed changing gear, the speed changing section configured to speed-change inputted power and to output the resultant power via the rotation support shaft, and a transmission mechanism configured to output the power of the rotation support shaft to a traveling device.

An example of such gear transmission as above is known from e.g. Patent Document 1. The gear transmission disclosed in Patent Document 1 includes, as "speed changing gears", a second low speed gear, a second high speed gear and a second reverse gear, a speed changing shaft as the "rotation support shaft", and a first shifter and a second shifter as "shift gears". Its transmission mechanism is configured such that power of the rotation support shaft is transmitted to a rear wheel differential device via a first speed reducing gear, a second speed reducing gear and a first output shaft and then outputted from the rear wheel differential device to rear wheels and also the power of the rotation support shaft is transmitted to a PTO shaft via the first speed reducing gear, the second speed reducing gear, a transmission gear, a second output shaft, etc., and then outputted from the PTO shaft to front wheels.

Patent Document 1: Japanese Unexamined Patent Application No. 2009-67082 document.

SUMMARY OF THE INVENTION

With this kind of conventional gear transmission, when a speed changing operation is to be effected, if respective end faces of the shift gear and the speed changing gear hit each other, ground-contact reaction force applied to the traveling device will be transmitted to the transmission mechanism to act on the rotation support shaft, thus preventing rotation of the shift gear and making engagement of the shift gear with the speed changing gear difficult. Therefore, a troublesome operation procedure is needed, involving removing the shift gear from the speed changing gear first and then sliding the shift gear toward the speed changing gear for re-engagement therewith.

The present invention provides a gear transmission that allows easy engagement of a shift gear with a speed changing gear even when respective end faces of the shift gear and the speed changing gear hit each other.

A gear transmission according to the present invention comprises:

a speed changing section including a speed changing gear for setting a speed stage and a shift gear slidably mounted on a rotation support shaft and operated to be engaged/disengaged to/from the speed changing gear, the speed changing section being configured to speed-change inputted power and to output the resultant power via the rotation support shaft; and a transmission mechanism configured to output the power of the rotation support shaft to a traveling device, the transmission mechanism having a transmission flexibility portion allowing free rotation of the rotation support shaft by a set rotational angle.

With the above-described arrangement, even if a ground-contact reaction force acting on the traveling device is applied to the transmission mechanism, the rotation support shaft can be rotated by the set rotational angle by the action of the transmission flexibility portion. Consequently, even if the respective end faces of the shift gear and the speed changing gear hit each other, as the shift gear is rotated with the rotation support shaft, so that a relative positional displacement may be readily provided between the shift gear and the speed changing gear to facilitate engagement of the shift gear to the speed changing gear.

In the present invention, preferably:

the transmission mechanism includes:

a rotation transmission shaft operably coupled to the rotation support shaft via a gear coupling mechanism, a front wheel output shaft coupled to the rotation transmission shaft for outputting power of the rotation transmission shaft to a front wheel as the traveling device, and a rear wheel differential mechanism coupled to the rotation transmission shaft for outputting power of the rotation transmission shaft to a rear wheel as the traveling device; and the transmission flexibility portion is provided at a portion of the rotation transmission shaft to which portion the gear coupling mechanism is coupled.

With the above-described arrangement, by simply providing the transmission flexibility portion only at the portion of the rotation transmission shaft to which portion the gear coupling mechanism is coupled, flexibility for the rotation support shaft by the set rotational angle is provided, in spite of the ground-contact reaction force acting on the front wheel and also in spite of the ground-contact reaction force acting on the rear wheel. Thus, with such simple arrangement of providing a small number of transmission flexibility portion (s), engagement of the shift gear with the speed changing gear can be facilitated.

In the present invention, preferably:

the transmission mechanism includes;

a first transmission gear gear-coupled to the rotation support shaft, a rear wheel differential mechanism having an input shaft coupled to the first transmission gear and configured to output power from the first transmission gear toward the rear wheel as the traveling device, a second transmission gear gear-coupled to the rotation support shaft, a rotation transmission shaft gear-coupled to the second transmission gear, and a front wheel output shaft coupled to the rotation transmission shaft for outputting power from the rotation transmission shaft to a front wheel as the traveling device; and the transmission flexibility portion is provided between the first transmission gear and the input shaft and also between the second transmission gear and the rotation transmission shaft.

With the above-described arrangement, free rotation of the rotation support shaft against the ground-contact reaction force acting on the rear wheel is allowed by the transmission flexibility portion provided between the first transmission gear and the input shaft. Similarly, free rotation of the rotation support shaft against the ground-contact reaction force acting on the front wheel is allowed by the transmission flexibility portion provided between the second transmission gear and the rotation support shaft. Thus, in spite of the ground-contact reaction force acting on the front wheel and also in spite of the ground-contact reaction force acting on the rear wheel, engagement of the shift gear with the speed changing gear can be facilitated.

DETAILED DESCRIPTION OF PREFERRED EMBODIMENTS

Next, an embodiment as an example of the present invention will be explained with reference to the accompanying drawings.

Figure 1:
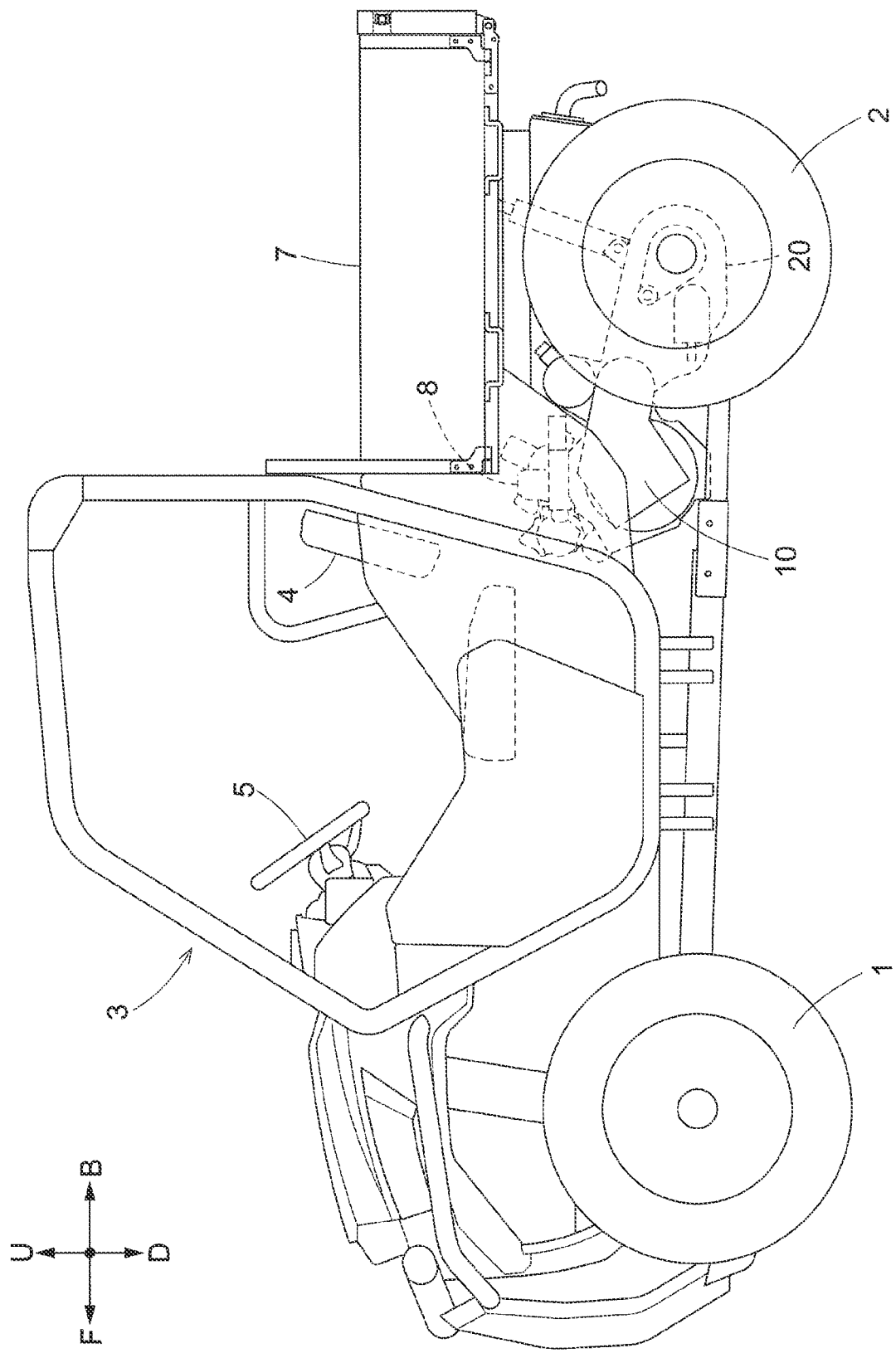
FIG. 1 is a left side view showing a multiple-purpose vehicle in its entirety.

Incidentally, in the following explanation, with respect to a traveling vehicle body of a multiple-purpose vehicle, the direction of arrow F shown in FIG. 1 is defined as "vehicle body front side", the direction of arrow B shown therein is defined as "vehicle body rear side", the direction of arrow U shown therein is defined as "vehicle body upper side", the direction of arrow D shown therein is defined as "vehicle body lower side", the direction on the near (front) side of the plane of illustration is defined as "vehicle body left side", and the direction on the far (back) side of the plane of illustration is defined as "vehicle body right side", respectively.

[General Arrangement of Multiple-Purpose Vehicle]

As shown in FIG. 1, the multiple-purpose vehicle includes a traveling vehicle body having a pair of steerable and drivable left and right front wheels 1 as "traveling devices" and a pair of drivable left and right rear wheels 2 as further "traveling devices". At a front/rear intermediate portion of the traveling vehicle body, a driving section 3 is formed. In this driving section 3, there are provided a driver's seat 4 and a steering wheel 5 for steering the front wheels 1. At a rear portion of the traveling vehicle body, a load-carrying deck 7 is provided. Beneath the load-carrying deck 7, there is provided an engine 8 outputting power to the front wheels 1 and the rear wheels 2.

[Traveling Power Transmission System]

Figure 2:
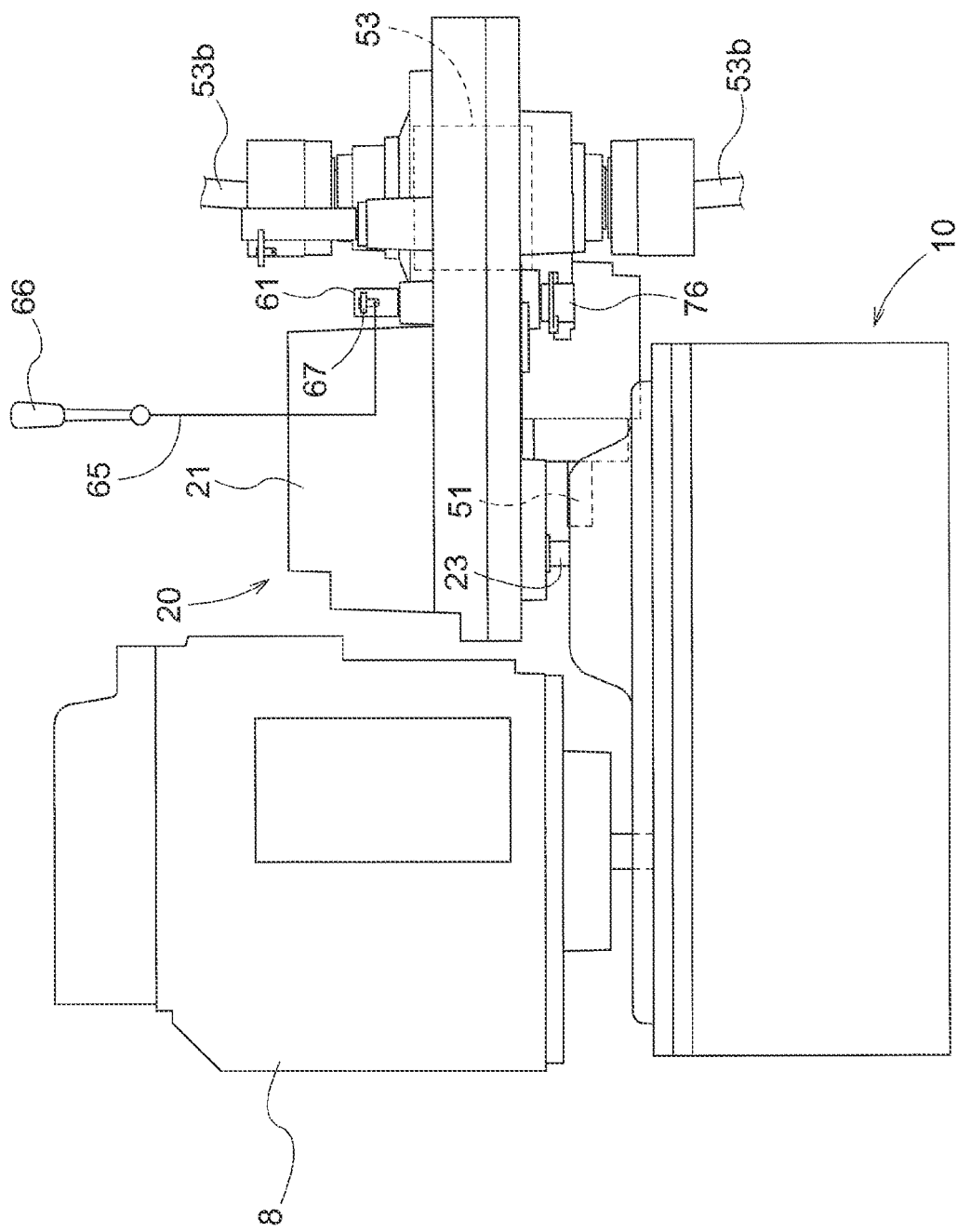
FIG. 2 is a plan view showing a traveling power transmission system.

FIG. 2 is a plan view showing a traveling power transmission system configured to transmit power from the engine 8 to the front wheels 1 (see FIG. 1) and the rear wheels 2 (see FIG. 1). This traveling power transmission system includes a stepless speed changing device 10 configured to speed-change power from the engine 8 and to output the resultant power to the front wheels 1 and the rear wheels 2, and a gear transmission 20. The gear transmission 20 is provided rearwardly of the engine 8. The stepless speed changing device 10 and the gear transmission 20 are arranged in series with each other so that the output of the stepless speed changing device 10 is inputted to the gear transmission 20. In this embodiment, power of an output shaft (not shown) of the engine 8 is inputted to the stepless speed changing device 10 and the power speed-changed by the stepless speed changing device 10 is inputted to the gear transmission 20 and the power speed-changed by the gear transmission 20 is outputted from a front wheel output shaft 51 (see FIG. 3) which protrudes forwardly from a lower portion of a transmission case 21 to the front wheels 1. The power speed-changed by the gear transmission 20 is transmitted from a rear wheel differential mechanism 53 provided within a rear portion of the transmission case 21 to the rear wheels 2 via left and right rear wheel driving shafts 53b. The front wheel output shaft 51 is coupled to a front wheel differential mechanism (not shown) provided inside a front wheel driving case 9 (see FIG. 1) via a rotational shaft 51a (see FIG. 1).

[Stepless Speed Changing Device]

As shown in FIG. 2, the stepless speed changing device 10 is provided between a lateral side of the engine 8 and a lateral side of the gear transmission 20. This stepless speed changing device 10 is constituted of a hydrostatic stepless speed changing device. The stepless speed changing device 10 is configured as a main speed changing device for changing driving speeds of the front wheels 1 and the rear wheels 2. Speed changing operations of the stepless speed changing device 10 are effected by a stepless speed changing operational tool (not shown) provided separately of a stepped speed changing operational tool 66 (see FIG. 2) for effecting speed changing operations of the gear transmission 20.

The stepless speed changing device 10 is configured as a main speed changing device for changing driving speeds of the front wheels 1 and the rear wheels 2. Speed changing operations of the stepless speed changing device 10 are effected by a stepless speed changing operational tool (not shown) coupled to an operational portion of the stepless speed changing device 10.

[Gear Transmission]

Figure 4:
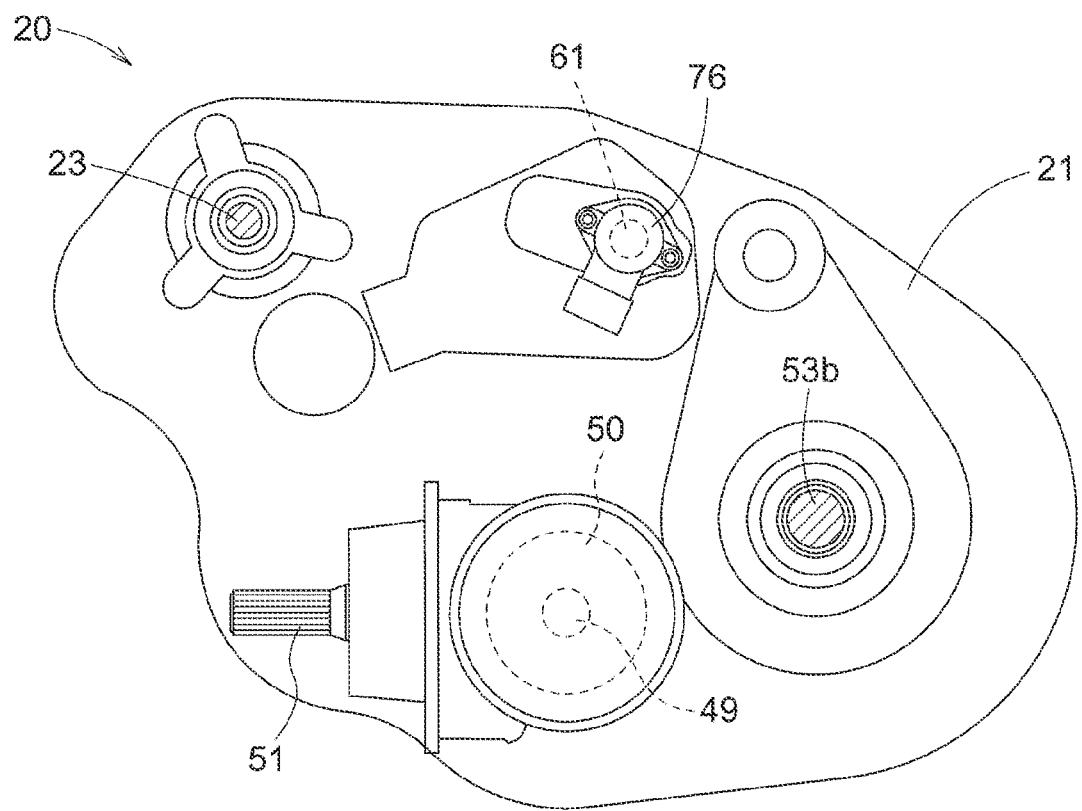
FIG. 4 is a left side view showing a gear transmission.
Figure 5:
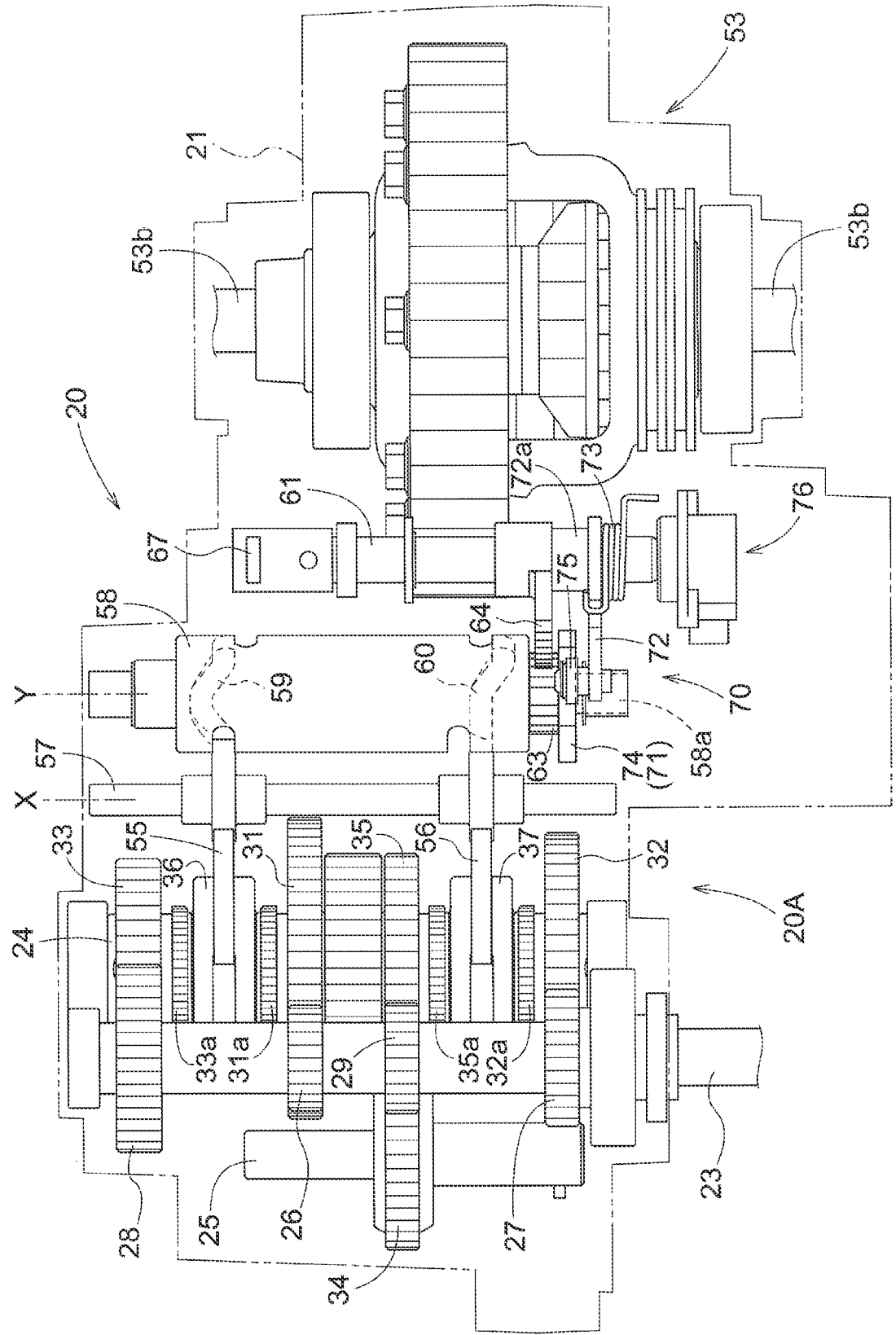
FIG. 5 is a plan view showing the gear transmission.
Figure 6:
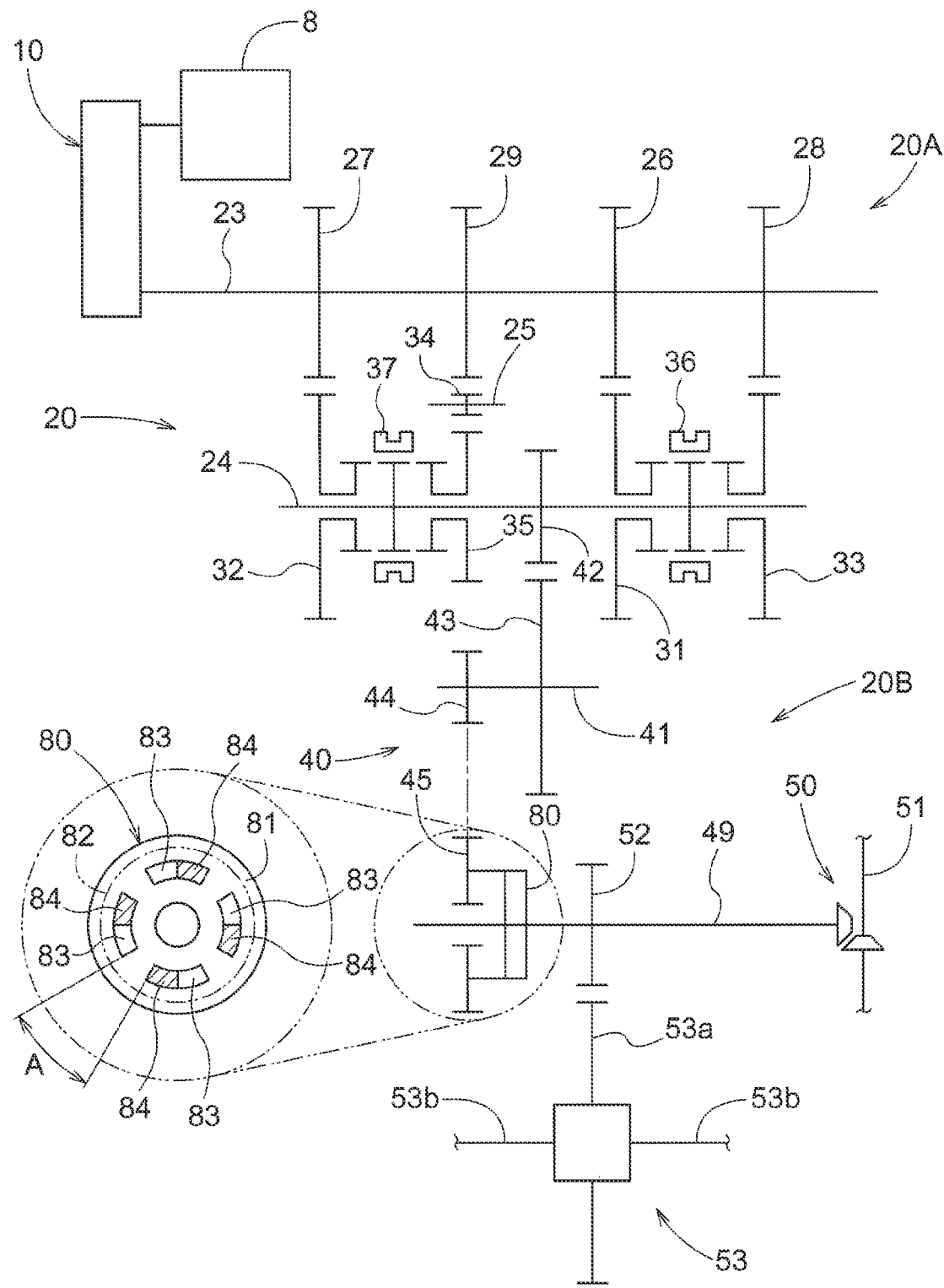
FIG. 6 is a diagram showing the gear transmission.

The gear transmission 20, as shown in FIG. 2, includes the transmission case 21 and is arranged in such a manner that the lateral width direction of the transmission case 21 is aligned with the lateral width direction of the traveling vehicle body. As shown in FIG. 4, FIG. 5 and FIG. 6, the gear transmission 20 includes a speed changing section 20A having a first shaft 23 rotatably supported to a front upper portion of the transmission case 21, etc. and a transmission mechanism 20B configured to output power of the speed changing section 20A to the front wheels 1 and the rear wheels 2.

The speed changing section 20A, as shown in FIGS. 5 and 6, includes, in addition to the first shaft 23, a second shaft 24 and a third shaft 25 which are provided inside the transmission case 21 and arranged side by side in parallel with the first shaft 23. The first shaft 23, the second shaft 24 and the third shaft 25 are provided to extend along the lateral width direction of the transmission case 21.

One end side of the first shaft 23 protrudes from the transmission case 21 toward the stepless speed changing device 10 and is coupled to an output pulley 13 of the stepless speed changing device 10. The first shaft 23 acts as an input shaft of the gear transmission 20. As shown in FIGS. 5 and 6, inside the transmission case 21, the first shaft 23 mounts thereon a first input gear 26, a second input gear 27, a third input gear 28, and a fourth input gear 29.

As shown in FIGS. 5 and 6, a second shaft 24, as a "rotation support shaft", rotatably mounts thereon a first speed (speed changing) gear 31 meshed with the first input gear 26 for setting a forward first speed, a second speed (speed changing) gear 32 meshed with the second input gear 27 for setting a forward second speed, and a third speed (speed changing) gear 33 meshed with the third input gear 28 for setting a forward third speed. A reverse-rotation gear 34 meshed with the fourth input gear 29 is mounted on a third shaft 25, and a reverse traveling gear 35 meshed with the reverse-rotation gear 34 for setting reverse first speed is rotatably mounted on the second shaft 24.

Figure 7:
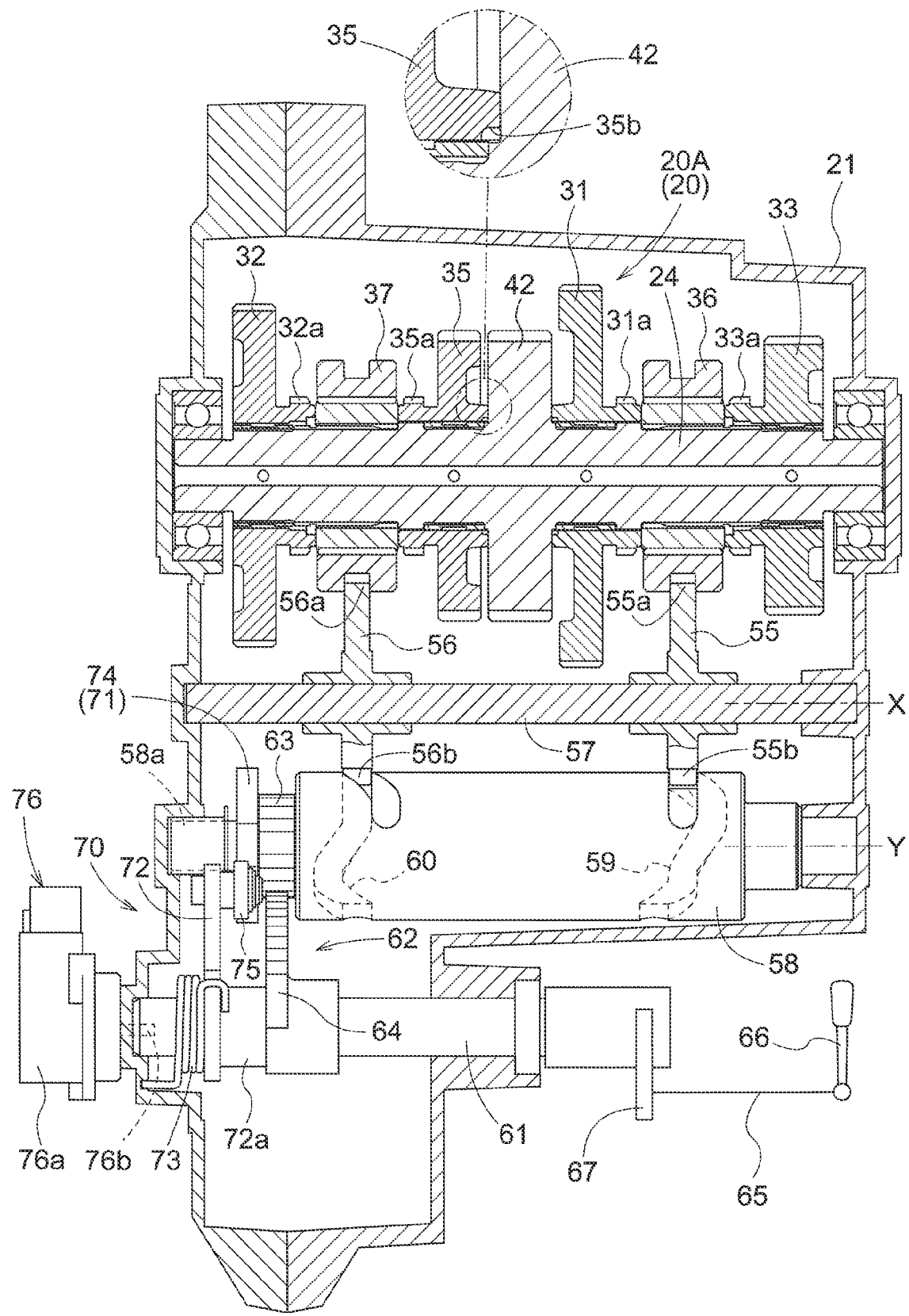
FIG. 7 is a section view showing a speed changing section of the gear transmission.

As shown in FIG. 7, the outside diameter of the first speed gear 31 is set larger than the outside diameter of the third speed gear 33. The outside diameter of the first speed gear 31 is set also larger than the outside diameter of the second speed gear 32. The outside diameter of the second speed gear 32 is set larger than the outside diameter of the third speed gear 33. The first speed gear 31 whose outside diameter is larger than the outside diameter of the second speed gear 32 and the outside diameter of the third speed gear 33 is located on more inner side than the second speed gear 32 and located also on more inner side than the third speed gear 33, in the lateral width direction of the transmission case 21.

As shown in FIG. 7, between the first speed gear 31 and the third speed gear 33, a first shift gear 36 is supported to the second shaft 24. The first shift gear 36 is supported on the second shaft 24 to be slidable to a transmission state in which the first shift gear 36 is meshed with a teeth portion 31a formed at a lateral portion of the first speed gear 31 to operably couple the first speed gear 31 to the second shaft 24, a transmission state in which the first shift gear 36 is meshed with a teeth portion 33a formed at a lateral portion of the third speed gear 33 to operably couple the third speed gear 33 to the second shaft 24, and a neutral state in which the first shift gear 36 is removed from the teeth portion 31a of the first speed gear 31 to release the operable coupling of the first speed gear 31 relative to the second shaft 24 and also removed from the teeth portion 33a of the third speed gear 33 to release the operable coupling of the third speed gear 33 relative to the second shaft 24.

As shown in FIG. 7, between the second speed gear 32 and the reverse traveling gear 35, a second shift gear 37 is supported to the second shaft 24. The second shift gear 37 is supported on the second shaft 24 to be slidable to a transmission state in which the second shift gear 37 is meshed with a teeth portion 32a formed at a lateral portion of the second speed gear 32 to operably couple the second speed gear 32 to the second shaft 24, a transmission state in which the second shift gear 37 is meshed with a teeth portion 35a formed at a lateral portion of the reverse traveling gear 35 to operably couple the reverse traveling gear 35 to the second shaft 24, and a neutral state in which the second shift gear 37 is removed from the teeth portion 32a of the second speed gear 32 to release the operable coupling of the second speed gear 32 relative to the second shaft 24 and also removed from the teeth portion 35a of the reverse traveling gear 35 to release the operable coupling of the reverse traveling gear 35 relative to the second shaft 24.

As shown in FIG. 6, the transmission mechanism 20B includes a fifth shaft 49 as a "rotation transmission shaft" having one end portion thereof operably coupled to the second shaft 24 via a gear coupling mechanism 40 having a fourth shaft 41, etc., a front wheel output shaft 51 operably coupled to the other end of the fifth shaft 49 via a bevel gear mechanism 50 for outputting power of the fifth shaft 49 to the front wheel 1, and a rear wheel differential mechanism 53 having an input gear 53a thereof operably coupled to an intermediate portion of the fifth shaft 49 for outputting power of the fifth shaft 49 to the rear wheel 2. The input gear 53a is engaged with a transmission gear 52 provided on the fifth shaft 49, thus being operably coupled to this fifth shaft 49. The front wheel output shaft 51 is provided to extend in the front/rear direction of the transmission case 21. The fourth shaft 41 and the fifth shaft 49 are provided to extend along the lateral width direction of the transmission case 21.

The gear coupling mechanism 40, as shown in FIG. 6, includes, in addition to the fourth shaft 41, a first transmission gear 42 mounted on the second shaft 24, a second transmission gear 43 mounted at one end portion of the fourth shaft 41 and meshed with the first transmission gear 42, a third transmission gear 44 provided at the other end portion of the fourth shaft 41, and a fourth transmission gear 45 meshed with the third transmission gear 44 and provided at one end portion of the fifth shaft 49.

As shown in FIG. 7, at an angular portion opposed to the first transmission gear 42 at the root portion of the reverse traveling gear 35, there is formed a stepped portion 35b for mitigating stress concentration. At an angular portion opposed to the first transmission gear 42 at the root portion of the first speed gear 31, there is formed a stepped portion similar to the stepped portion 35b of the reverse traveling gear 35.

As shown in FIGS. 5 and 7, a first shifter 55 having a leading end portion 55a thereof engaged with the first shift gear 36 and a second shifter 56 having a leading end portion 56a thereof engaged with the second shift gear 37 are slidably supported on a shifter support shaft 57. This shifter support shaft 57 is supported to the transmission case 21 in parallel juxtaposition with the second shaft 24. A shift drum 58 having a drum axis Y parallel with a support axis X of the shifter support shaft 57 is rotatably supported to the transmission case 21. In the outer circumferential portion of the shift drum 58, there are provided a first shifter operating cam portion 59 to which an operation portion 55b of the first shifter 55 is engaged and a second shifter operating cam portion 60 to which an operation portion 56b of the second shifter 56 is engaged. The first shifter operating cam portion 59 and the second shifter operating cam portion 60 are constituted of guide grooves into which the operation portions 56b, 56b respectively come into slidable engagement. As the shift drum 58 is rotated about the drum axis Y, the first shifter 55 is slid along the shifter support shaft 57 by the first shifter operating cam portion 59 to slide the first shift gear 36 and the second shifter 56 is slid along the shifter support shaft 57 by the second shifter operating cam portion 60 to slide the second shift gear 37.

There is provided a speed changing operation shaft 61 for rotating the shift drum 58. Specifically, the speed changing operation shaft 61, as shown in FIGS. 5 and 7, extends along the lateral width direction of the transmission case 21 and is rotatably supported to an upper portion of the transmission case 21 in parallel juxtaposition with the drum axis Y. As shown in FIG. 7, inside the transmission case 21, between one end portion of the speed changing operation shaft 61 and a supporting shaft portion 58a of the shift drum 58, there is provided a coupling mechanism 62 for operably coupling the speed changing operation shaft 61 with the shift drum 58. When the speed changing operation shaft 61 is rotatably operated, power of the speed changing operation shaft 61 is transmitted by the coupling mechanism 62 to the supporting shaft portion 58a, whereby the shift drum 58 is operated.

Figure 8:
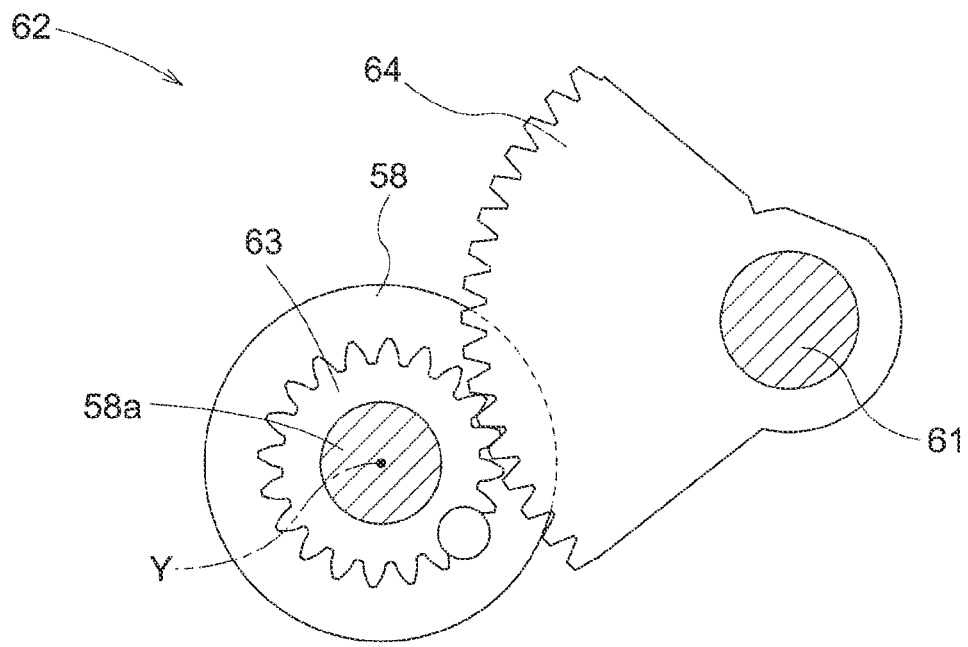
FIG. 8 is a side view showing a coupling mechanism.

The coupling mechanism 62, as shown in FIGS. 7 and 8, includes a drum operating gear 63 provided on the support shaft portion 58a of the shift drum 58 and rotatable with the shift drum 58 and a transmission gear 64 provided at one end portion of the speed changing operation shaft 61 as being meshed with the drum operating gear 63 and rotatable with the speed changing operation shaft 61. The transmission gear 64 is constituted of a fan-shaped gear.

As shown in FIGS. 2 and 7, a stepped speed changing operational tool 66 is coupled via the coupling mechanism 65 to the speed changing operation shaft 61. The stepped speed changing operational tool 66 is provided at the driving section 3. The coupling mechanism 65 includes a pivot arm 67 extended from the end portion of the speed changing operation shaft 61 opposite to the side where the coupling mechanism 62 is provided, an operation cable for coupling the pivot arm 67 to the stepped speed changing operational tool 66, etc.

[Detent Mechanism]

A detent mechanism 70 is provided for fixing the shift drum 58 at a rotation operation position where the first shift gear 36 and the second shift gear 37 are engaged with each other or under the neutral state. The detent mechanism 70 is provided inside the transmission case 21.

Figure 9:
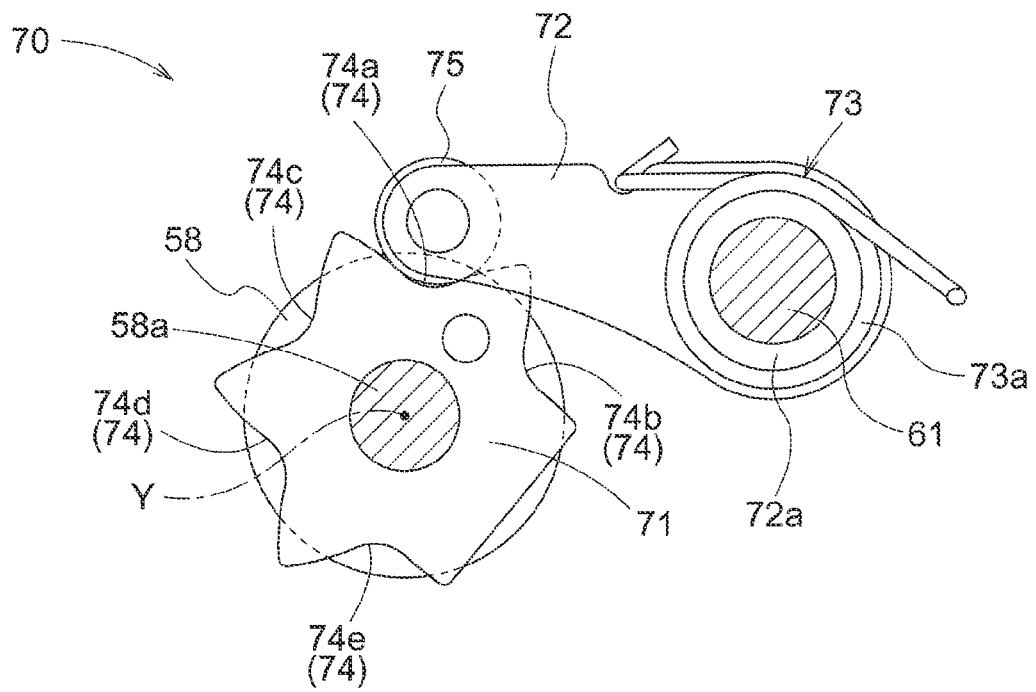
FIG. 9 is a side view showing a detent mechanism.

Specifically, the detent mechanism 70, as shown in FIGS. 7 and 9, includes a positioning rotation portion 71 formed at the support shaft portion 58a of the shift drum 58 and a positioning spring 73 having a coil portion 73a thereof engaged on a boss portion 72a of a positioning arm 72.

At five positions in the circumference portion of the positioning rotation portion 71, there are provided receded portions 74 as "positioning action portions". The positioning arm 72 is rotatably supported, at a boss portion 72a provided at the base portion thereof, on the speed changing operation shaft 61. At the free end portion of the positioning arm 72, a roller 75 is rotatably provided. In operation, as the positioning arm 72 is pivoted about the speed changing operation shaft 61 in association with rotation of the positioning rotation portion 71, the positioning arm 72 will be engaged/disengaged with/from the receded portion 74 by the roller 75 and with this engagement in the receded portion 74, the positioning rotation portion 71 is fixed in a rotational position corresponding to the rotation operation position of the shift drum 58. One end portion of the positioning spring 73 is retained to the positioning arm 72 and the other end portion of the positioning spring 73 is retained to the transmission case 21. The positioning arm 72 is pivotally urged by the positioning spring 73 to be engaged in the receded portion 74.

[Rotation Potentiometer]

A rotation potentiometer 76 is provided for detecting an operation position (operated position) of the speed changing operation shaft 61. This rotation potentiometer 76, as shown in FIGS. 4 and 7, is provided outside the transmission case 21. A meter case 76a of the rotation potentiometer 76 is screw-fixed to the transmission case 21. A rotation operation shaft 76b of the rotation potentiometer 76 is disposed such that the axis of this rotation operation shaft 76b is positioned on the axis of the speed changing operation shaft 61. The rotation operation shaft 76b and the speed changing operation shaft 61 are engaged with each other to be rotatable in unison. More particularly, the rotation operation shaft 76b and the speed changing operation shaft 61 are engaged with each other to be rotatable in unison, with engagement of the rotation operation shaft 76b in a coupling hole provided in the speed changing operation shaft. The engagement between the rotation operation shaft 76b and the speed changing operation shaft 61 is realized by the rotation operation shaft 76b and a non-circular shape of the coupling hole.

The gear transmission 20 is configured to be speed-changed as an auxiliary speed changing device which changes the driving speeds of the front wheels 1 and the rear wheels 2 in a reverse traveling one speed, and forward traveling three speeds, in total four speeds. Speed changing operations of the gear transmission 20 are effected by the stepped speed changing operational tool 66.

Figure 3:
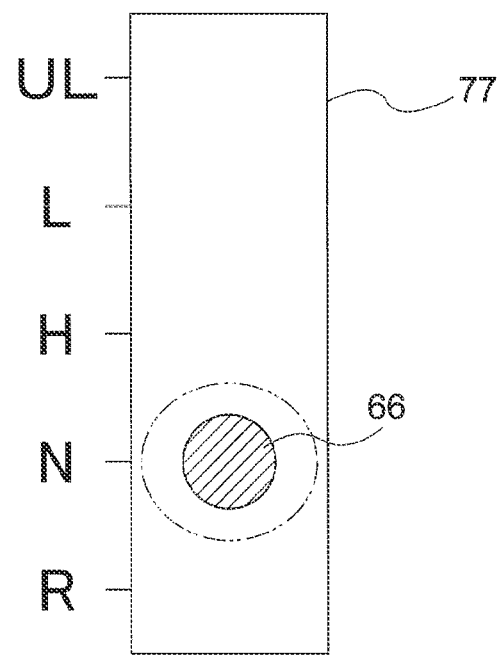
FIG. 3 is an explanatory view showing operational positions of a stepped speed changing operational tool.

More particularly, as shown in FIG. 3, the stepped speed changing operational tool 66, in association with pivotal operations thereof, is guided by an operational tool guide 77 to be switched over to a neutral position [N], a reverse (reverse traveling) position [R], a forward first speed position [UL], a forward second speed position [L] and a forward third speed position [H].

The forward second speed position [L] is an operation position of a lower speed than the forward third speed position [H]. The forward first speed position [UL] is an operation position of a lower speed than the forward second speed position [L]. Switching operations of the stepped speed changing operation tool 66 to the neutral position [N], the forward third speed position [H], the forward second speed position [L] and the forward first speed position [UL] are effected in this mentioned order. Namely, the stepped speed changing operation tool 66 is switched from the neutral position [N] to the forward third speed position [H], switched from the forward third speed position [H] to the forward second speed position [L] and switched from the forward second speed position [L] to the forward first speed position [UL].

When the stepped speed changing operation tool 66 is operated to the neutral position [N], the speed changing operation shaft 61 is rotated by the operation force of the stepped speed changing operation tool 65 and in response to the operation force of the speed changing operation shaft 61, the shift drum 58 is rotated to a rotation operation position for realizing the neutral state. Then, the first shifter 55 is slid by the first shifter operating cam portion 59, whereby the first shift gear 36 is operated by the first shifter 55 to a state disengaged from the first speed gear 31 and from the third speed gear 33. Further, the second shifter 56 is slid by the second shifter operating cam portion 60, whereby the second shift gear 37 is operated by the second shifter 56 to a state disengaged from the second speed gear 32 and the reverse traveling gear 35. As the positioning rotation portion 71 is rotated in unison with the shift drum 58, the positioning arm 72 is engaged in a first receded portion 74a of the receded portions 74 provided at the five positions and the shift drum 58 is position-fixed by the detent mechanism 70 at the rotation operation position providing the neutral state (the rotation operation position where the first shift gear 36 and the second shift gear 37 are disengaged). In the gear transmission 20, the neutral state is provided, whereby transmission of power of the first shaft 23 to the second shaft 24 is stopped and the output to the front wheels 1 and the rear wheels 2 is stopped. The gear transmission 20 is maintained under the neural state by the detent mechanism 70. The rotation operation shaft 76b of the rotation potentiometer 76 is rotatably operated by the speed changing operation shaft 61 and the operation position of the speed changing operation shaft 61 is detected by the rotation potentiometer 76, and the detection result is outputted as detection result of the neutral state of the gear transmission 20 from the rotation potentiometer 76 to a display device (not shown) or the like.

When the stepped speed changing operation tool 66 is operated to the reverse position [R], by the operation force of the speed changing operation shaft 61, the shift drum 58 is operated to the rotation operation position realizing reverse traveling. Then, the first shifter 55 is slid by the first shifter operating cam portion 59 and the first shift gear 36 is operated by the first shifter 55 to a state disengaged from the first speed gear 31 and the third speed gear 33. Further, the second shifter 56 is slid by the second shifter operating cam portion 60, and the second shift gear 37 is operated by the second shifter 56 into a state engaged with the reverse traveling gear 35. The positioning rotation portion 71 is rotated in unison with the shift drum 58 and the positioning arm 72 is engaged with a second receded portion 74b of the receded portions 74 provided at the five positions and the shift drum 58 is maintained by the detent mechanism 70 at the rotation operation position realizing reverse traveling (the rotation operation position at which the second shift gear 37 is engaged with the reverse traveling gear 35 and the first shift gear 36 is disengaged from the first speed gear 31 and the third speed gear 33). In the gear transmission 20, reverse traveling state is provided, whereby the power of the first shaft 23 is speed-changed into reverse traveling power by a fourth input gear 29, a reverse-rotation gear 34 and a reverse traveling gear 35 and reverse traveling power is transmitted to the second shaft 24 and inputted from this second shaft 24 to the transmission mechanism 20B and reverse traveling power is outputted from the front wheel output shaft 51 to the front wheels 1 and reverse traveling power is outputted from the rear wheel differential mechanism 53 to the rear wheels 2. The gear transmission 20 is maintained under the reverse traveling transmission state by the detent mechanism 70. The rotation operation shaft 76b of the rotation potentiometer 76 is rotated by the speed changing operation shaft 61 and the operation position of the speed changing operation shaft 61 is detected by the rotation potentiometer 76 and the result of this detection is outputted from the rotation potentiometer 76 as detection result of the reverse traveling transmission state of the gear transmission 20.

When the stepped speed changing operation tool 66 is operated to the forward third speed position [H], by the operation force of the stepped speed changing operation tool 66, the speed changing operation shaft 61 is rotated and by the operation force of this speed changing operation shaft 61, the shift drum 58 is rotatably operated to the rotation operation position realizing forward third speed. Then, the first shifter 55 is slid by the first shifter operating cam portion 59 and the shift gear 36 is operated by the first shifter 55 into a state engaged with the third speed gear 33. Further, the second shifter 56 is slid by the second shifter operating cam portion 60 and the second shift gear 37 is operated by the second shifter 56 into a state disengaged from the second speed gear 32 and the reverse traveling gear 35. The positioning rotation portion 71 is rotated in unison with the shift drum 58 and the positioning arm 72 is engaged in a third receded portion 74c of the receded portions 74 provided at the five positions, and the shift drum 58 is fixed in position by the detent mechanism 70 at the rotation operation position realizing the forward third speed (the rotation position at which the first shift gear 36 is engaged with the third speed gear 33 and the second shift gear 37 is disengaged from the second speed gear 32 and from the reverse traveling gear 35). In the gear transmission 20, there is provided a forward traveling transmission state of the forward traveling third speed, whereby the power of the first shaft 23 is speed-changed to the forward traveling third speed power by the third input gear 28 and the third speed gear 33 and the forward traveling third speed power is transmitted to the second shaft 24 and inputted from this second shaft 24 to the transmission mechanism 20B and forward traveling third speed power of higher speed than the forward traveling first speed and the forward traveling second speed is outputted from the front wheel output shaft 51 to the front wheels 1, and the forward traveling power of the forward traveling third speed is outputted from the rear wheel differential mechanism 53 to the rear wheels 2. The gear transmission 20 is maintained under the forward traveling state of the forward third speed by the detent mechanism 70. The rotation operation shaft 76b of the rotation potentiometer 76 is rotatably operated by the speed changing operation shaft 61 and the operation position of the speed changing operation shaft 61 is detected by the rotation potentiometer 76 and the result of this detection as detection result of the forward traveling transmission state of the forward traveling third speed of the gear transmission 20 is outputted from the rotation potentiometer 76.

When the stepped speed changing operation tool 66 is operated to the forward traveling second speed [L], by the operation force of the stepped speed changing operation tool 66, the speed changing operation shaft 61 is rotatably operated and by the operation force of the speed changing operation shaft 61, the shift drum 58 is operated to the rotation operation position realizing forward traveling second speed. Then, the first shifter 55 is slid by the first shifter operating cam portion 59 and the first shift gear 36 is operated by the first shifter 55 into a state disengaged from the first speed gear 31 and from the third speed gear 33. Further, the second shifter 56 is slid by the second shifter operating cam portion 60 and the second shift gear 37 is operated by the second shifter 56 into a state engaged with the second speed gear 32. The positioning rotation portion 71 is rotated in unison with the shift drum 58 and the positioning arm 72 is engaged in a fourth receded portion 74d of the receded portions 74 provided at the five positions, and the shift drum 58 is fixed in position by the detent mechanism 70 at the rotation operation position realizing the forward second speed (the rotation position at which the first shift gear 36 is disengaged from the first speed gear 31 and from the third speed gear 33 and the second shift gear 37 is engaged with the second speed gear 32). In the gear transmission 20, there is provided a forward traveling transmission state of the forward traveling second speed, whereby the power of the first shaft 23 is speed-changed to the forward traveling second speed power by the second input gear 27 and the second speed gear 32 and the forward traveling second speed power is transmitted to the second shaft 24 and inputted from this second shaft 24 to the transmission mechanism 20B and forward traveling second speed power of lower speed than the forward traveling third speed and also higher speed than the forward traveling first speed and the forward traveling second speed is outputted from the front wheel output shaft 51 to the front wheels 1, and the forward traveling power of the forward traveling second speed is outputted from the rear wheel differential mechanism 53 to the rear wheels 2. The gear transmission 20 is maintained under the forward traveling state of the forward second speed by the detent mechanism 70. The rotation operation shaft 76b of the rotation potentiometer 76 is rotatably operated by the speed changing operation shaft 61 and the operation position of the speed changing operation shaft 61 is detected by the rotation potentiometer 76 and the result of this detection as detection result of the forward traveling transmission state of the forward traveling second speed of the gear transmission 20 is outputted from the rotation potentiometer 76.

When the stepped speed changing operation tool 66 is operated to the forward traveling first speed [UL], by the operation force of the stepped speed changing operation tool 66, the speed changing operation shaft 61 is rotatably operated and by the operation force of the speed changing operation shaft 61, the shift drum 58 is operated to the rotation operation position realizing forward traveling first speed. Then, the first shifter 55 is slid by the first shifter operating cam portion 59 and the first shift gear 36 is operated by the first shifter 55 into a state engaged with the first speed gear 31. Further, the second shifter 56 is slid by the second shifter operating cam portion 60 and the second shift gear 37 is operated by the second shifter 56 into a state disengaged from the second speed gear 32 and from the reverse traveling gear 35. The positioning rotation portion 71 is rotated in unison with the shift drum 58 and the positioning arm 72 is engaged in a fifth receded portion 74e of the receded portions 74 provided at the five positions, and the shift drum 58 is fixed in position by the detent mechanism 70 at the rotation operation position realizing the forward first speed (the rotation position at which the first shift gear 36 is engaged with the first speed gear 31 and the second shift gear 37 is disengaged from the second speed gear 32 and from the reverse traveling gear 35). In the gear transmission 20, there is provided a forward traveling transmission state of the forward traveling first speed, whereby the power of the first shaft 23 is speed-changed to the forward traveling first speed power by the first input gear 26 and the first speed gear 31 and the forward traveling first speed power is transmitted to the second shaft 24 and inputted from this second shaft 24 to the transmission mechanism 20B and forward traveling first speed power of lower speed than the forward traveling third speed and also higher speed than the forward traveling third speed and the forward traveling second speed is outputted from the front wheel output shaft 51 to the front wheels 1, and the forward traveling power of the forward traveling first speed is outputted from the rear wheel differential mechanism 53 to the rear wheels 2. The gear transmission 20 is maintained under the forward traveling state of the forward first speed by the detent mechanism 70. The rotation operation shaft 76b of the rotation potentiometer 76 is rotatably operated by the speed changing operation shaft 61 and the operation position of the speed changing operation shaft 61 is detected by the rotation potentiometer 76 and the result of this detection as detection result of the forward traveling transmission state of the forward traveling first speed of the gear transmission 20 is outputted from the rotation potentiometer 76.

[Transmission Flexibility Portion]

As shown in FIG. 6, the transmission mechanism 20B includes a transmission flexibility portion 80 configured to allow free rotation of the second shaft 24 as the "rotation support shaft" by a set rotation angle. More particularly, this transmission flexibility portion 80 is provided at a portion of the fifth shaft 49 as the "rotation transmission shaft" at which portion the gear coupling mechanism 40 is coupled. This portion of the fifth shaft 49 at which portion the gear coupling mechanism 40 is coupled is a portion of the fifth shaft 49 on more transmission-wise upstream than the portions of the fifth shaft 49 at which portions the front wheel output shaft 51 and the rear wheel differential mechanism 53 are coupled. The transmission flexibility portion 80, as shown in FIG. 6, includes a transmitting rotation portion 81 provided in the fourth transmission gear 45 and rotatable with this fourth transmission gear 45 and a transmitted rotation portion 82 provided on the fifth shaft 49 and rotatable together with the fifth shaft 49. At a plurality of positions in the lateral portion of the transmitting rotation portion 81, transmitting protrusions 83 are provided, whereas, at a plurality of positions in the lateral portion of the transmitted rotation portion 82, transmitted protrusions 84 are provided. The transmitting protrusions 83 and the transmitted protrusions 84 are provided in such a manner that one transmitted protrusion 84 is engaged between mutually adjacent transmitting protrusions 83 and also the transmitting protrusions 83 and the transmitted protrusions 84 are position-displaceable by a set displacement angle A relative to each other.

With the transmission flexibility portion 80 in operation, as the transmitting protrusion 83 and the transmitted protrusion 84 come into abutment each other via respective end faces thereof, transmission of forward traveling power from the fourth transmission gear 45 to the fifth transmission shaft 49 is effected. When the transmitting protrusion 83 and the transmitted protrusion 84 come into abutment each other via respective other end faces thereof, transmission of reverse traveling power from the fourth transmission gear 45 to the fifth shaft 49 is effected. And, by the relative positional displacement by the set displacement angle A between the transmitting protrusion 83 and the transmitted protrusion 84, free rotation of the second shaft 24 by the set rotation angle is allowed.

When the first shift gear 36 is to be engaged with the first speed gear 31, even if respective end faces of the first shift gear 36 and the teeth portion 31a of the first speed gear 31 hit each other, as free rotation of the second shaft 24 is allowed by the transmission flexibility portion 80, the first shift gear 36 and the first speed gear 31 can easily be displaced relative to each other in the rotational direction, so that the first shift gear 36 can come into engagement with the teeth portion 31a of the first speed gear 31 easily. This is also true with the case of the first shift gear 36 being engaged with the third speed gear 33, the case of the second shift gear 37 being engaged with the second speed gear 32 and the case of the second shift gear 37 being engaged with the reverse traveling gear 35.

In this embodiment, the transmitting protrusions 83 and the transmitted protrusions 84 are provided. However, the transmission flexibility portion may be alternatively configured such that a receded portion is provided in one of the transmitting rotation portion 81 and the transmitted rotation portion 82 and a transmitting protrusion which can slidably engage into the receded portion to be slidable by a set rotation angle is provided in the other of the transmitting rotation portion 81 and the transmitted rotation portion 82.

Figure 10:
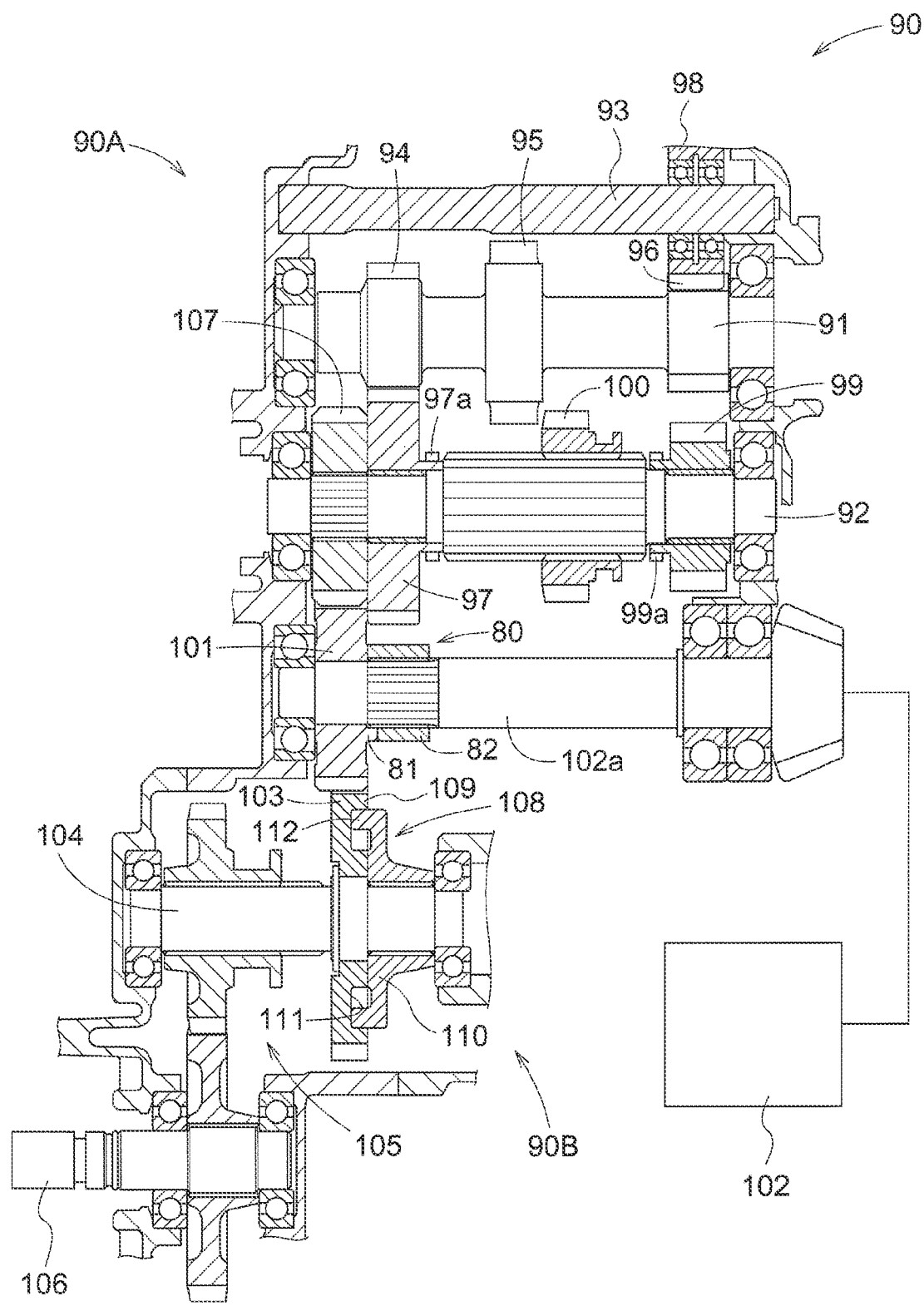
FIG. 10 is a section view of a gear transmission according to a further embodiment.

Other Embodiments (1) FIG. 10 is a section view showing a gear transmission 90 according to a further embodiment. The gear transmission 90 according to the further embodiment, as shown in FIG. 10, includes a speed changing section 90A, as an "input shaft", for speed-changing power of the first shaft 91 and a transmission mechanism 90B configured to output the power speed-changed by the speed changing section 90A to the front wheels 1 (see FIG. 1) and to the rear wheels 2 (see FIG. 1).

The speed changing section 90A, as shown in FIG. 10, includes a first shaft 91 as an "input shaft", and a second shaft 92 and a third shaft 93 which are disposed in parallel with the first shaft 91. The first shaft 91 mounts a first input gear 94, a second input gear 95 and a third input gear 96. A first speed changing gear 97 for setting forward traveling first speed meshed with the first input gear 94 is rotatably mounted on the second shaft 92. A reverse rotation gear 98 meshed with the third input gear 96 is mounted on the third shaft 93. A reverse gear 99 for reverse traveling setting meshed with the reverse rotation gear 98 is rotatably mounted on the second shaft 92. At a portion of the second shaft 92 between the first speed gear 97 and the reverse gear 99, a shift gear 100 is slidably mounted.

The transmission mechanism 90B includes a first transmission gear 101 gear-coupled with the second shaft 92 as a "rotation support shaft", a rear wheel differential mechanism 102 having an input shaft 102a coupled to the first transmission gear 101, a second transmission gear 103 gear-coupled to the second shaft 92, a rotation transmission shaft 104 coupled to the second transmission gear 103, and a front wheel output shaft 106 coupled to the rotation transmission shaft 104 via a gear coupling mechanism 105. The first transmission gear 101 is meshed with an output gear 107 mounted on the second shaft 92 and gear-coupled to the second shaft 92 via the output gear 107. The second transmission gear 103 is meshed with the first transmission gear 101 and gear-coupled to the second shaft 92 via the first transmission gear 101 and the output gear 107.

With the transmission mechanism 90B in operation, power of the second shaft 92 is inputted via the output gear 107 to the first transmission gear 101 and the inputted power is inputted via the first transmission gear 101 to the rear wheel differential mechanism 102 and outputted from the rear wheel differential mechanism 102 to the rear wheels 2. The power of the second shaft 92 is inputted from the output gear 107 via the first transmission gear 101 to the second transmission gear 103 and transmitted from the second transmission gear 103 via the rotation transmission shaft 104 and the gear coupling mechanism 105 to the front wheel output shaft 106 and from this front wheel output shaft 106 to the front wheel 1.

In the gear transmission 90, as the shift gear 100 is slid to be engaged/disengaged with/from the first speed gear 97, the second input gear 95 and the reverse gear 99, whereby speed changing operations in three stages of forward traveling two speed stages and reverse traveling one speed stage are effected, thereby to output forward traveling first speed power or the forward traveling second speed power or the reverse traveling power to the front wheels 1 and the rear wheels 2.

Specifically, when the shift gear 100 is engaged with a teeth portion 97a provided at a lateral portion of the first speed gear 97, the first speed gear 97 and the second shaft 92 are operably coupled to each other by the shift gear 100. With this, in the gear transmission 90, there is provided a forward traveling transmission state of forward first speed, whereby power of the first shaft 91 is speed-changed by the first input gear 94 and the first speed changing gear 97 to forward traveling power of forward first speed and transmitted as such via the shift gear 100 to the second shaft 92 and inputted from the output gear 107 to the transmission mechanism 90B and the forward traveling power of forward first speed is inputted from the first transmission gear 101 to the rear wheel differential mechanism 102 and outputted from this rear wheel differential mechanism 102 to the rear wheel 2. Further, the forward traveling power of the forward first speed is transmitted from the first transmission gear 101 to the second transmission gear 103 and from this second transmission gear 103 to the front wheel output shaft 106, and outputted from the front wheel output shaft 106 to the front wheel 1.

When the shift gear 100 is engaged with the second input gear 95, the second input gear 95 and the second shaft 92 are coupled to each other by the shift gear 100. With this, in the gear transmission 90, there is provided a forward traveling transmission state of forward second speed, whereby power of the first shaft 91 is speed-changed by the second input gear 95 and the shift gear 100 to forward traveling power of forward second speed and transmitted as such via the shift gear 100 to the second shaft 92 and inputted from the output gear 107 to the transmission mechanism 90B and the forward traveling power of forward second speed is inputted from the first transmission gear 101 to the rear wheel differential mechanism 102 and outputted from this rear wheel differential mechanism 102 to the rear wheel 2. Further, the forward traveling power of the forward second speed is transmitted from the first transmission gear 101 to the second transmission gear 103 and from this second transmission gear 103 to the front wheel output shaft 106, and outputted from the front wheel output shaft 106 to the front wheel 1.

When the shift gear 100 is engaged with a teeth portion 99a provided at a lateral portion of the reverse gear 99, the reverse gear 99 and the second shaft 92 are operably coupled to each other by the shift gear 100. With this, in the gear transmission 90, there is provided a reverse traveling transmission state, whereby power of the first shaft 91 is speed-changed by the third input gear 96, the reverse rotation gear 98 and the reverse gear 99 to reverse traveling power and transmitted as such to the second shaft 92 and inputted via the output gear 107 to the transmission mechanism 90B, and the reverse traveling power is inputted via the first transmission gear 101 to the rear wheel differential mechanism 102 and outputted from this rear wheel differential mechanism 102 to the rear wheel 2. Further, the revere traveling power is transmitted from the first transmission gear 101 to the second transmission gear 103 and transmitted from the second transmission gear 103 to the front wheel output shaft 106 and outputted from the front wheel output shaft 106 to the front wheel 1.

[Transmission Flexibility Portion]

Between the first transmission gear 101 and the input shaft 102a, there is provided a transmission flexibility portion 80 configured to allow free rotation of the second shaft 92 by a set rotation angle. And, between the rotation transmission shaft 104 and the second transmission gear 103, there is provided a transmission flexibility portion 108 configured to allow free rotation of the second shaft 92 by a set rotation angle.

The transmission flexibility portion 80 provided between the first transmission gear 101 and the input shaft 102a has an identical arrangement to that of the transmission flexibility portion 80 shown in FIG. 6. Against a ground-contacting reaction force acting on the rear wheel 2, free rotation of the second shaft 92 is allowed by the transmission flexibility portion 80.

Figure 11:
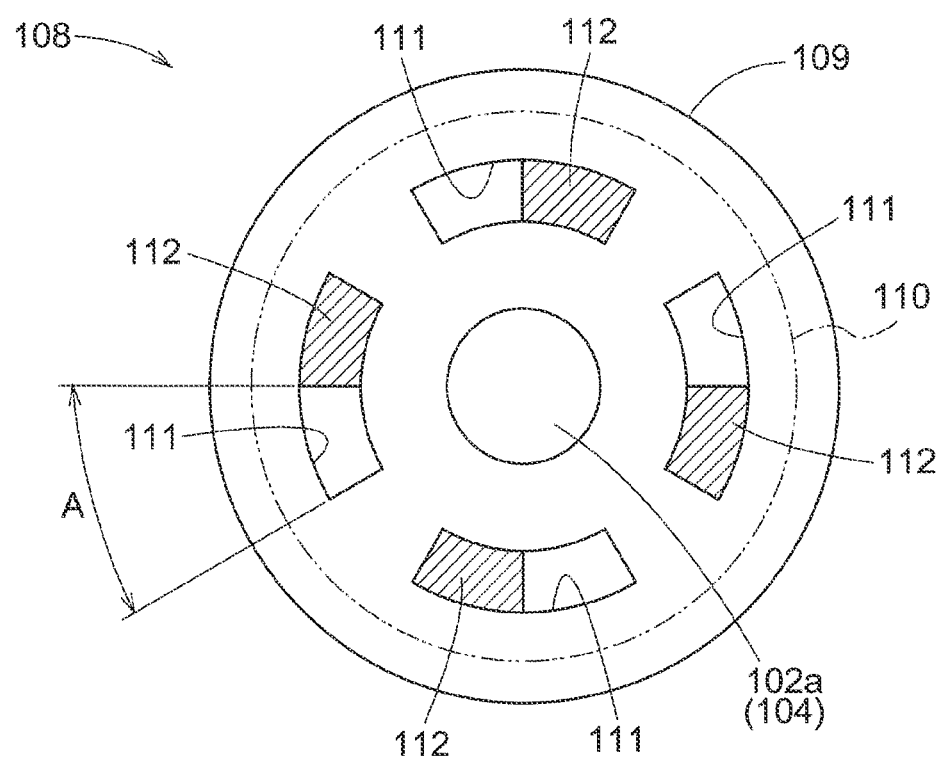
FIG. 11 is a section view showing a transmission flexibility portion.

The transmission flexibility portion 108 provided between the rotation transmission shaft 104 and the second transmission gear 103, as shown in FIG. 11, includes a transmitting rotation portion 109 provided in the second transmission gear 103 and rotatable in unison with the second transmission gear 103 and a transmitted rotation portion 110 provided in the rotation transmission shaft 104 and rotatable in unison with the rotation transmission shaft 104. At a plurality of positions in the lateral portion of the transmitting rotation portion 109, receded portions 111 are provided; whereas, at a plurality of positions in the lateral portion of the transmitted rotation portion 110, transmitting protrusions 112 are provided. The receded portions 111 and the transmitting protrusions 112 are provided with one transmitting protrusion 112 being engaged in one receded portion 111. The transmitting protrusions 112 are engaged in the receded portions 111 in such a manner to allow positional displacement between the receded portions 111 and the transmitting protrusions 112 by a relative set displacement angle A in the rotation direction of the second transmission gear 103.

With the transmission flexibility portion 108 in operation, when the transmitting rotation portion 109 and the transmitted rotation portion 110 are engaged with each other with the transmitting protrusion 112 being located on one end side of the receded portion 111 and with one end face of the transmitting protrusion 112 being placed in contact with the inner wall of the receded portion, transmission of the forward traveling power is effected from the second transmission gear 103 to the rotation transmission shaft 104. And, when the transmitting rotation portion 109 and the transmitted rotation portion 110 are engaged with each other, with the transmitting protrusion 112 being located on the other end side of the receded portion 111 and the other end face of the transmitting protrusion 112 being placed in contact with the inner wall of the receded portion 111, transmission of the reverse traveling power is effected from the second transmission gear 103 to the rotation transmission shaft 104.

The transmission flexibility portion 108 allows free rotation of the second shaft 92 against the ground-contacting reaction force applied to the front wheel 1.

(2) In the foregoing embodiment, there was disclosed an example in which the stepless speed changing device 10 is constituted of a hydrostatic type stepless speed changing device. The invention is not limited thereto, but the stepless speed changing device 10 may be constituted of various kinds of stepless speed changing device.

(3) In the foregoing embodiment, there was disclosed an example in which the stepless speed changing device 10 and the gear transmission 20 are provided in series in such a manner that power from the engine 8 is inputted to the stepless speed changing device 10 and output of the stepless speed changing device 10 is inputted to the gear transmission 20. Alternatively, the stepless speed changing device 10 and the gear transmission 20 may be provided in series in such a manner that power from the engine 8 is inputted to the gear transmission 20 and output of the gear transmission 20 is inputted to the stepless speed changing device 10.

(4) In the foregoing embodiment, there was disclosed an example in which the gear transmission 20 is configured to be capable of speed changing in reverse traveling one speed and forward traveling two speeds. Alternatively, it may be configured to be capable of speed changing in two or more reverse traveling speeds and three or more reverse traveling speeds.

INDUSTRIAL APPLICABILITY

The present invention is applicable to a gear transmission including a speed changing gear for setting a speed stage, a shift gear slidably mounted on a rotation support shaft and operated to be engaged/disengaged to/from the speed changing gear, a speed changing section configured to speed-change inputted power and to output the resultant power via the rotation support shaft and a transmission mechanism configured to output the power of the rotation support shaft to a traveling device.

DESCRIPTION OF SIGNS

24: rotation support shaft
31: speed (changing) gear (first speed (changing) gear)
32: speed (changing) gear (second speed (changing) gear)
33: speed (changing) gear (third speed (changing) gear)
35: speed (changing) gear (reverse traveling gear)
36: shift gear (first shift gear)
37: shift gear (second shift gear)
40: gear coupling mechanism
51: front wheel output shaft
53: rear wheel differential mechanism
80: transmission flexibility portion
92: rotation support shaft (second shaft)
95: speed (changing) gear (second input gear)
97: speed (changing) gear (first speed (changing) gear)
99: speed (changing) gear (reverse gear)
100: shift gear
101: first transmission gear
102: rear wheel differential mechanism
102a: input shaft
103: second transmission gear
104: rotation transmission shaft
106: front wheel output shaft
108: transmission flexibility portion

The invention claimed is:
1. A gear transmission comprising:
a speed changing section comprising a speed changing gear for setting a speed stage and a shift gear slidably mounted on a rotation support shaft and operated to engage and disengage with the speed changing gear, the speed changing section configured to speed-change inputted power and to output resultant power via the rotation support shaft; and
a transmission mechanism configured to output the power of the rotation support shaft to a traveling device, the transmission mechanism having a transmission flexibility portion allowing free rotation of the rotation support shaft by a set rotational angle,
wherein the transmission mechanism comprises:
a first transmission gear gear-coupled to the rotation support shaft;
a rear wheel differential mechanism having an input shaft coupled to the first transmission gear and configured to output power from the first transmission gear toward the rear wheel as the traveling device;
a second transmission gear gear-coupled to the rotation support shaft;
a rotation transmission shaft gear-coupled to the second transmission gear; and
a front wheel output shaft coupled to the rotation transmission shaft for outputting power from the rotation transmission shaft to a front wheel as the traveling device; and
wherein the transmission flexibility portion is provided between the first transmission gear and the input shaft and also between the second transmission gear and the rotation transmission shaft.

* * * * *